No. 779,163. PATENTED JAN. 3, 1905.
H. E. IRWIN.
PNEUMATIC SPRING.
APPLICATION FILED SEPT. 30, 1903.
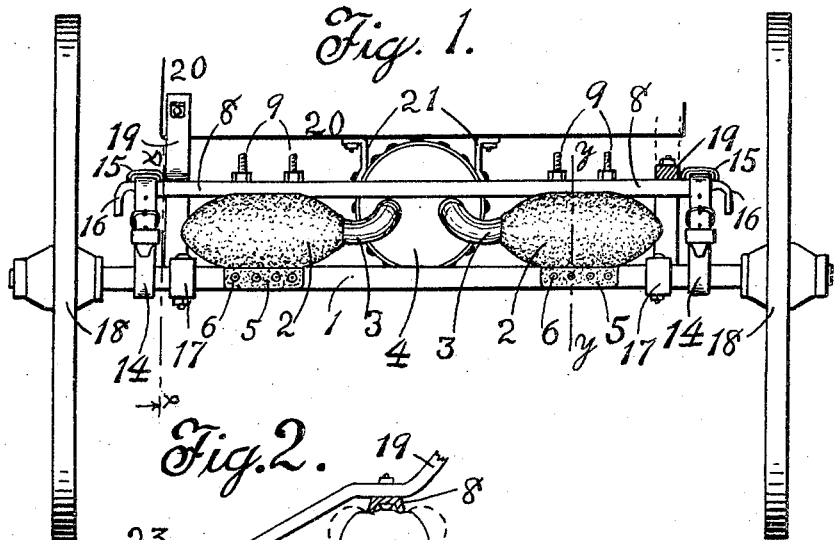
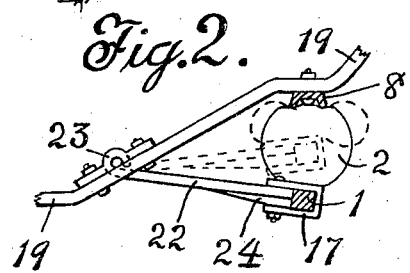
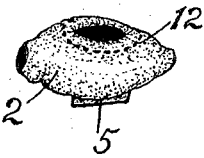
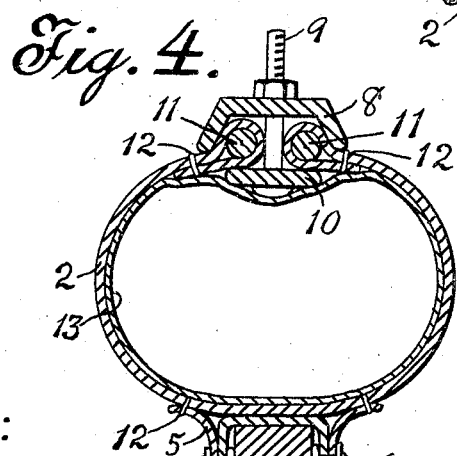
Witnesses:
Clyde Finney
Geo. F. Swenson
Inventor:
Herbert E. Irwin No. 779,163.

Patented January 3, 1905.

UNITED STATES PATENT OFFICE.

HERBERT E. IRWIN, OF GALESBURG, ILLINOIS.

PNEUMATIC SPRING.

SPECIFICATION forming part of Letters Patent No. 779,163, dated January 3, 1905.

Application filed September 30, 1903. Serial No. 175,103.

*To all whom it may concern:*

Be it known that I, HERBERT E. IRWIN, a citizen of the United States, residing at Galesburg, in the county of Knox and State of Illinois, have invented certain new and useful Improvements in Pneumatic Springs, of which the following is a specification.

For the purpose of absorbing jars and making riding more comfortable in vehicles, electric cars, or steam-coaches leaf or strap steel springs of various forms as well as coiled-wire springs have been in use for a very long time. Within more recent times rubber has been utilized in absorbing or lessening jars by forming it into a compound and securing it to the outer side of a wheel-rim, and when used in such a capacity it is known as a "solid-rubber tire." Later pneumatic rubber tires were used to lessen jars and to increase the comfort of vehicle-riding. Many attempts have been made to absorb jars in the wheel itself, and to this end wheels have been constructed with bent spring-spokes. Another effort has been made to absorb jars by placing a wheel within a wheel, the inner wheel being supplied with a pneumatic tire and the outer wheel with a solid-rubber tire. Some one has made a wheel with a pneumatic hub for the purpose of absorbing jars. We have, therefore, two methods of absorbing jars in vehicle transportation, one of which is by application of the means for that purpose to the wheel itself and the other is by the application of means placed between the wheel-axle and the vehicle or car body. The former method is more especially adapted to absorb short and rapid vibrations, while the latter to absorb longer and slower vibrations.

In designing my pneumatic spring I have made use of air, because it is the best known elastic body. A foot-ball, for example, could be used for a pneumatic spring by placing it inflated between two plates; but we would find that it would only absorb short vibrations. The reason for this is that the volume of compressed air is reduced too rapidly. We would find by experiment that the air-pressure becomes very high when the plates approach each other closely and that to obtain the best results they should be allowed to approach each other as near as one-third or one-fourth of the diameter of the ball. When the plates subject the ball to considerable pressure, the sides of the ball will bulge out, and unless the cover will stretch under this strain it is likely to burst. It is poor policy to stretch the cover, but rather only to bend it. By placing a cylindrical or oblong shaped air-bag between two testing-plates we find we are dealing with a side-wall and not a circular-wall proposition and that the side walls will bend in and out as the pressure varies without stretching the walls of the cover. We also find that the cylindrical or oblong shaped air-bag has large contact-surfaces which quickly enlarge as the load increases.

In a pneumatic tire there is a large air volume and a comparatively small air displacement due to the compression of the tire only at the point of contact with the road-surface. To absorb long vibrations, it is evident that means should be provided to allow some of the air to be removed from under the loaded plate. An important factor in the designing of a pneumatic spring is the consideration of the air volume and its pressure in relation to the air volume displaced due to an increased load or change of the vibrating part, or, in other words, the ratio of varying air volumes to varying loads.

The principal object of my present invention is to construct a pneumatic spring that will absorb both short and long vibrations, and such a spring is more especially adapted to be placed between a wheel-axle and car-body.

Another object of my invention is to construct a pneumatic spring that may be placed in such a position that it will be protected from undue wear and tear, thereby lengthening its life indefinitely.

A further object of the invention is to construct a cylindrical or oblong shaped air-bag formed of flexible material and adapted to lie longitudinally between two rigid bodies, one of which receives jars and the other carries the load, the air-bag having a connection with an additional air-chamber for the purpose of controlling the air-pressure.

Also another object of my invention is to supply a steam-coach, an electric car, and the like with a pneumatic spring which may absorb vibrations caused by the car-wheels passing over the ends of car-rails.

Still another object of my invention is to produce a pneumatic spring that will give better results than are now obtained by steel springs and which may work in conjunction with steel springs or to displace them in whatever capacity they may be used.

These and such other objects as may hereinafter appear are attained by the devices illustrated in the accompanying drawings, in which—

Figure 1 is a rear view of a vehicle running-gear equipped with my pneumatic spring. Fig. 2 is a side view at line $x$ $x$ of Fig. 1. Fig. 3 shows a pneumatic cover removed from the vehicle with the air-bladder withdrawn from it. Fig. 4 is a sectional view at line $y$ $y$ of Fig. 1.

Like numerals of reference designate corresponding parts in the several figures of the drawings.

Referring to the drawings, 18 represents the vehicle-wheels, which are connected by axle 1, above which is located channel-bar 8, which is supported by side frame-bars 19. Between the axle and the channel-bar are two flexible covers 2, within which lie air-bladders 13, that are connected integrally with air-tubes 3, which preferably pass through openings in the ends of the covers to a steel air-chamber 4, that is secured in place to the vehicle-body 20 by ears or brackets 21. Straps 14 prevent bar 8 from rising above a given distance from the axle and are retained in their proper place by clips 15. In order to prevent the pneumatic bags from being pinched due to jars or varying loads, I have provided the ends of bar 8 with downwardly-extending projections, which are arranged to strike axle 1 when they approach each other a given distance. Fastening-clamp 17 connects axle 1 to link-arms 22 and 24, which by means of hooked ends 23 engage pivotally a metallic plate that is bolted to the vehicle-body, thus permitting of a free movement to the link-arms when a jar is being absorbed and the pneumatic bag is being compressed, as shown by dotted lines in Fig. 2. Pneumatic cover 2 incloses an air-bladder 13, which is formed of a rubber compound.

11 indicates a fabric cord about which the edge of cover 2 is folded and secured by stitches 12.

Channel-bar 8 is equipped with a bolt 9, that supports metallic strap-piece 10, so that by inserting the enlarged edges of the pneumatic cover between the channel-bar and metallic strap-piece and by tightening up bolts 9 the edges of the cover are securely locked in the channel-bar. Flexible strips 5 are secured to cover 2 by stitches 12 and to steel channel-piece 7, which sits astride axle 1, by rivets 6. The pneumatic bag is therefore securely held in place between the axle and channel-bar 8 and receives the weight of the vehicle-body.

In Fig. 2 there is shown in dotted outline the position the axle and compressed-air bag would take were the wheels of the vehicle to pass over a projecting rock in the road-surface and the pneumatic spring absorbing the jar, allowing the vehicle-body to float on air, as it were.

I have shown in Fig. 1 two compressed-air bags connected to a common air-chamber, which is a cylinder formed of riveted sheet-steel. The results would be the same were the cylinder replaced by an air-bag.

The advantage of having pneumatic springs connected to a common air-chamber is that of obtaining an equal pressure in all. However, in case of a leak the whole system would suffer.

In equipping a railway-coach it is necessary to supply a large enough area of compressed-air bags to sufficiently float the weight of the car, and the air-chambers may be made in sufficient number and of the desired shape and size to accomplish the required result. In such an instance the pneumatic springs need not all be connected, so that in case of a leak the system would not be disabled.

A pneumatic spring may be strengthened or weakened by simply increasing or decreasing the air-pressure. Thus the same degree of comfort in riding is afforded in a lightly as well as in a heavily loaded vehicle.

It is obvious that a vehicle, electric car, or railway-coach equipped with my pneumatic spring would be much easier to ride in and would much more fully absorb jars than one equipped only with steel springs. In the drawings I have not shown the vehicle equipped with steel springs in connection with the pneumatic springs. However, it is evident that, if desirable, such a combination could be readily used.

While I have shown my pneumatic spring as applied to a vehicle, it is evident that its application may be widely extended, and all such changes as fairly fall within the scope of this invention are contemplated by the following claims.

Having thus fully described my invention, what I claim, and desire to secure by Letters Patent, is—

1. In a pneumatic spring, the combination with a longitudinal flexible cover, of an air-bladder 13, an air-tube 3 connected thereto, and an air-chamber 4, said cover having an opening therein through which is inserted the air-bladder, and means for securing the said cover between two rigid bodies, substantially as described.

2. A pneumatic spring consisting of a flexible cover having two openings therein and an inner air-bladder, said air-bladder having a connection with an air-tube arranged to extend through one of said openings to an air-chamber, the other opening in the cover having enlarged edges adjacent thereto, and means engaging said edges whereby the cover is secured to a rigid body, substantially as described.

3. A pneumatic spring consisting of a flexible cover and an inner air-bladder, said bladder being connected with an air-tube arranged to extend through an opening in said cover to an air-chamber, the said cover being provided with a metallic member adapted to lie over the vehicle-axle and to hold the pneumatic spring in place, substantially as described.

4. A pneumatic spring consisting of a flexible cover having an opening therein adapted to receive an air-bladder, the edges of the cover adjacent to said opening being secured between two rigid members acting as clamps, said members being held together by means of bolts passing through themselves only, substantially as described.

5. A pneumatic spring consisting of a flexible cover having an opening therein adapted to receive an air-bladder having a connection with an additional air-compressed volume, the edges of the flexible cover adjacent to the said opening being provided with enlarged edges and means for engaging said enlarged edges whereby the cover is secured to a rigid body, substantially as described.

6. A pneumatic spring consisting of a flexible cover having an opening therein adapted to receive an air-bladder, the edges of the flexible cover adjacent to the said opening being provided with enlarged edges arranged to lie in the channel of a rigid metallic bar, and means for retaining the said enlarged edges in the channel-bar, substantially as described.

7. A pneumatic spring consisting of a flexible air-chamber secured between two rigid bodies, one of said bodies having its ends bent down and arranged to strike a rigid body to prevent the air-chamber from being pinched thereby, substantially as described.

8. A pneumatic spring consisting of a flexible cover having an opening therein adapted to receive an air-bladder, the edges of the cover adjacent to said opening being secured between two rigid members acting as clamps, said members being held together by means passing through themselves only, the said cover being arranged to lie between a vehicle-axle and vehicle-body, the said axle being provided with means secured pivotally to the vehicle-body, substantially as described.

9. A pneumatic spring consisting of a flexible cover and an inner air-bladder, said bladder having an air-tube connection with an air-chamber, the said cover being secured between the vehicle body and axle, said axle having a pivotal connection with the vehicle-body by means of fastening-clamp 17 and link-arms 22 and 24 having hooks on the ends thereof, substantially as described.

In testimony whereof I have signed my name to this specification in the presence of two subscribing witnesses.

HERBERT E. IRWIN.

Witnesses:
   PHILIP S. POST,
   PETER MOORE.